May 1, 1962 J. CAMBRON 3,032,347
CHUCK STOP
Filed Sept. 16, 1960
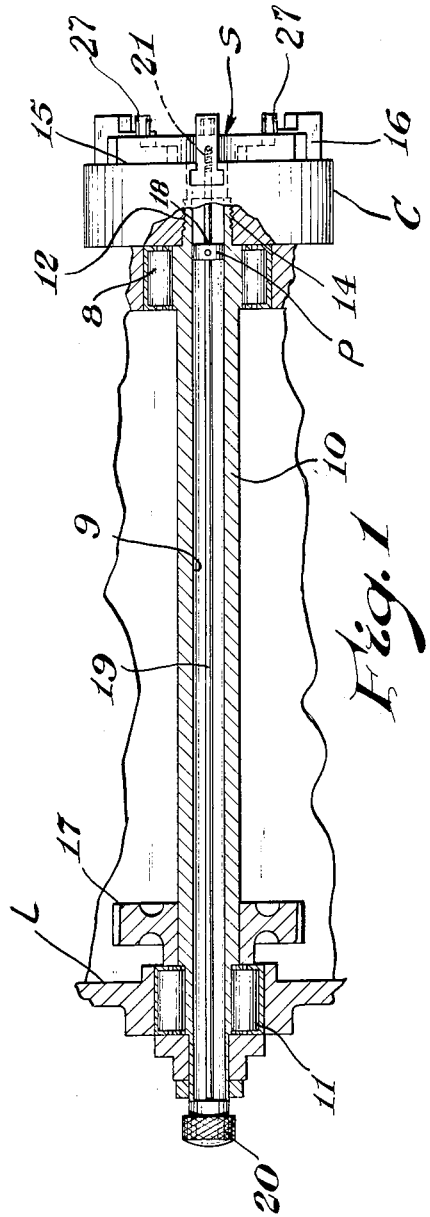
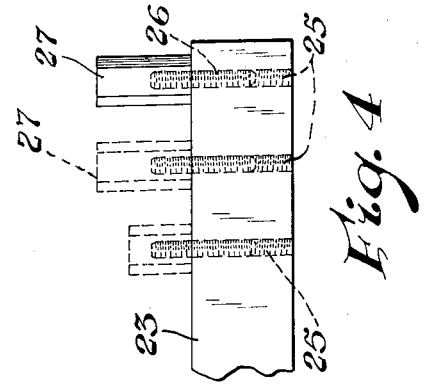
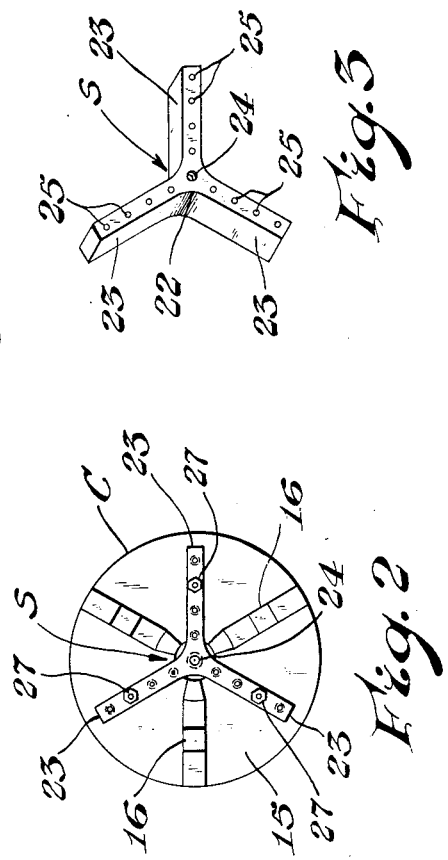
INVENTOR.
John Cambron
BY
Searman Searman & McCulloch
ATTORNEYS.

United States Patent Office 3,032,347
Patented May 1, 1962

3,032,347
CHUCK STOP
John Cambron, 700 S. Madison Ave., Bay City, Mich.
Filed Sept. 16, 1960, Ser. No. 56,431
4 Claims. (Cl. 279—1)

This invention relates to an adjustable chuck stop for use with the chuck of a conventional lathe to assure the "work" being accurately and squarely held in the chuck without altering the chuck or in any manner changing the operation thereof.

More specifically, the invention proposes a very simple, practical and inexpensive chuck stop which can be easily and quickly mounted in position, and which is centrally bored and threaded to accommodate the draw rod of the lathe, so that the chuck stop may be adjusted and held tightly in position against the face of the chuck without interference with the conventional jaws of the chuck.

Another object of the invention is to provide a chuck stop which can be changed from one machine to another, and which can be used in conjunction with any type of chuck, either self centering, independent, manual or air operated, and regardless of the number of jaws on the chuck.

A further object is to provide a chuck stop which can be made up in any thickness desired depending on the "work," which will hold the "work" accurately parallel, and which is especially adaptable for general multiple turning and boring operations.

Still a further object is to provide a pilot bushing and chuck stop which can be made up in a number of sizes, which will insure accurate centering of the draw rod in the lathe, and which can be manufactured and sold in sets to suit various kinds of "work" required.

A further object is to design an adjustable chuck stop disposed in intimate facial contact with the face of the lathe chuck and which forms a firm backing for the part or "work" to be turned or bored; permitting more accurate and secure gripping of thin workpieces by the chuck jaws, and eliminating the normal tendency to flex and be distorted out of its natural plane, under pressure of the jaws, and/or pressure of the working tools being used.

Still a further object is to provide interchangeable means radially adjustable on the wings of the chuck stop for adjusting or locating the work outwardly with relation to the body of the stop, thus providing ample clearance for the tools used when turning, boring, threading or finishing such bores.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

FIG. 1 is a fragmentary, part sectional, longitudinal view through a lathe spindle showing the locating pilot bushing and the chuck stop mounted in position on the chuck.

FIG. 2 is an enlarged end elevational view of the chuck with the chuck stop in position thereon.

FIG. 3 is a perspective view of the chuck stop.

FIG. 4 is an enlarged, fragmentary, side elevational view of one of the wings showing spacers of various lengths.

Referring now more specifically to the drawing in which I have shown one embodiment of my invention. The letter L indicates generally a lathe of conventional design and includes a head stock 8, centrally bored as at 9 to accommodate a longitudinally disposed lathe spindle 10 mounted in bearings 11 as usual, the end of the spindle being turned and threaded as at 12 to accommodate a chuck C, which is centrally bored and threaded as at 14 to receive the threaded end of the spindle, or it can be secured in any other desired manner.

The face 15 of the chuck is flat, and a plurality of radially disposed gripping jaws 16 are mounted thereon and are adapted to be adjusted by a removable turning tool (not shown), as usual. A suitable drive pulley 17 is mounted on the spindle 10 and is drivingly connected to a conventional source of power (not shown), in any desired manner.

A pilot bushing P is mounted in the lathe spindle 10 directly adjacent the turned and threaded end 12, said bushing being centrally bored as at 18 to accommodate the lathe draw rod 19 which extends therethrough, the outer end of said rod being equipped with a knob 20 to facilitate manipulation thereof, while the opposite end is threaded as at 21 and for a purpose to be presently described.

The chuck C is of conventional design and includes a plurality of radially disposed jaws 16 as usual, and a chuck stop S is mounted on the face of said chuck, said chuck stop being formed with a hub 22, having a plurality of radially projecting wings 23 formed integral therewith and disposed in intimate facial contact with the face of the chuck, the hub 22 being bored and threaded as at 24 to receive the threaded end 21 of the draw rod to draw it firmly against the face of the chuck when the knob 20 is actuated, the wings 23 being disposed between the jaws 16 and in no manner interfere with the operation of the jaws.

The hub 22 of the stop S is disposed parallel to the center line of the lathe, and the wings 23 project outwardly from said hub, each wing having a plurality of spaced apart, threaded passages 25 provided therein, said passages accommodating the threaded ends 26 of spacer members 27, as clearly shown in FIG. 4 of the drawing. These spacers 27 are manufactured in sets of different lengths, the sets are interchangeable to accommodate "workpieces" of various sizes and to space the "work" the required predetermined distance from the face of the chuck.

This arrangement permits adjusted spacing of the "workpiece" from the face of the chuck stop to provide tool clearance for the jaws of the chuck as well as clearance for turning and boring operations in general.

While I have illustrated and described my chuck stop in combination with a lathe, it will be understood that it can be used on all types of machine tools, dividing head, or measuring and inspection devices using a jaw chuck as a work holding device, and it enables the operator to position his "workpiece" in the chuck so that the workpiece is square and parallel at all times.

From the foregoing description, it will be obvious that I have perfected a very simple, practical, and inexpensive chuck stop and pilot bushing for the purposes described.

What I claim is:

1. The combination with a lathe having a hollow spindle on which a chuck is mounted, a locating pilot bushing mounted in said spindle directly adjacent said chuck, an adjustable draw bar extending through said spindle and pilot bushing and projecting into said chuck, a multi-winged chuck stop mounted on the face of the chuck and engageable by said draw bar to bottom it firmly against the face of the chuck, and quickly removable spacer members mounted on the wings of the chuck stop for spacing the "work" from the face of the chuck.

2. The combination defined in claim 1 in which a plurality of threaded passages are provided in the wings of the chuck stop, and sets of spacer members of predetermined lengths interchangeably mounted in said threaded passages.

3. The combination in a lathe having a spindle, of a lathe chuck having a flat face with clamping jaws mounted on the face thereof; a multi-winged chuck stop centered on the face of said chuck and against which the work to be clamped is held; a locating pilot bushing in said spindle, adjusting means mounted in the spindle and extending through said bushing and chuck, and engaging said chuck stop for securing it firmly against the face of the chuck, and quickly interchangeable sets of spacer members mounted on the wings of the chuck stop for spacing the "workpiece" from the face of said chuck.

4. The combination with a lathe having a spindle on which a chuck is mounted; a pilot bushing mounted in said spindle; a multi-wing chuck stop mounted on the face of the chuck; adjusting means mounted in said spindle and extending through said bushing and engageable with said chuck stop for securing it in position on the chuck, and a plurality of sets of interchangeable spacer members adapted for mounting on the wings of the chuck stop, each set serving to space the work a predetermined distance from the face of the chuck.

References Cited in the file of this patent
UNITED STATES PATENTS

| | | |
|---|---|---|
| 2,513,138 | Burness et al. | June 27, 1950 |
| 2,524,006 | Capellozzi | Sept. 26, 1950 |
| 2,842,371 | Kersten | July 8, 1958 |

FOREIGN PATENTS

| | | |
|---|---|---|
| 24,251 | Denmark | Mar. 10, 1919 |